US011857978B2

(12) United States Patent
Stark et al.

(10) Patent No.: US 11,857,978 B2
(45) Date of Patent: Jan. 2, 2024

(54) SYSTEM AND METHOD FOR AN ELECTRODYNAMIC FRAGMENTATION

(71) Applicants: Diehl Defence GmbH & Co. KG, Ueberlingen (DE); Fraunhofer Gesellschaft zur Förderung der angewandten Forschung e. V., Munich (DE)

(72) Inventors: Robert Stark, Bad Windsheim (DE); Volker Thome, Schliersee (DE); Severin Seifert, Raubling (DE); Sebastian Dittrich, Rosenheim (DE); Christian Bickes, Roethenbach an der Pegnitz (DE); Juergen Urban, Erlangen (DE)

(73) Assignees: Diehl Defence GmbH & Co. KG, Ueberlingen (DE); Fraunhofer Gesellschaft zur Förderung der angewandten Forschung e. V., Munich (DE)

( * ) Notice: Subject to any disclaimer, the term of this patent is extended or adjusted under 35 U.S.C. 154(b) by 551 days.

(21) Appl. No.: 17/082,313

(22) Filed: Oct. 28, 2020

(65) Prior Publication Data

US 2021/0069724 A1 Mar. 11, 2021

Related U.S. Application Data

(63) Continuation of application No. PCT/EP2019/060740, filed on Apr. 26, 2019.

(30) Foreign Application Priority Data

Apr. 28, 2018 (DE) ............................ 102018003512

(51) Int. Cl.
*B02C 19/18* (2006.01)
*B02C 23/10* (2006.01)
(Continued)

(52) U.S. Cl.
CPC .............. *B02C 19/18* (2013.01); *B02C 23/10* (2013.01); *B02C 23/14* (2013.01); *B02C 23/38* (2013.01); *B02C 2019/183* (2013.01)

(58) Field of Classification Search
CPC ... B02C 19/18; B02C 2019/183; B02C 23/10; B02C 23/14; B02C 23/38
See application file for complete search history.

(56) References Cited

U.S. PATENT DOCUMENTS

| | | | | |
|---|---|---|---|---|
| 3,715,082 A * | 2/1973 | Carley-Macauly | B02C 19/18 | 241/73 |
| 3,770,212 A * | 11/1973 | Kassir | B02C 19/18 | 241/1 |

(Continued)

FOREIGN PATENT DOCUMENTS

| | | |
|---|---|---|
| CN | 103857471 A | 6/2014 |
| CN | 107206390 A | 9/2017 |

(Continued)

*Primary Examiner* — Faye Francis
(74) *Attorney, Agent, or Firm* — Laurence A. Greenberg; Werner H. Stemer; Ralph E. Locher

(57) ABSTRACT

A fragmentation system for electrodynamic fragmentation of material contains a feed and an outlet for transporting material along a transport path in a transport direction. At least one high-voltage pulse source is provided, each of the high-voltage pulse sources contains at least one first electrode and at least one second electrode for generating a high-voltage discharge in a discharge chamber. The transport path has a fractionation section, and the fractionation section extends through the discharge chamber. A selection device for selectively extracting the material on the transport path is provided in order to channel material and/or fragments of the material having a diameter smaller than a minimum diameter past at least one portion of one of the fractionation sections.

15 Claims, 2 Drawing Sheets

(51) Int. Cl.
*B02C 23/14* (2006.01)
*B02C 23/38* (2006.01)

(56) References Cited

U.S. PATENT DOCUMENTS

| | | | | | |
|---|---|---|---|---|---|
| 4,313,573 | A * | 2/1982 | Goldberger | B02C 19/18 241/1 |
| 4,540,127 | A * | 9/1985 | Andres | B02C 19/18 241/1 |
| 5,842,650 | A * | 12/1998 | Hofmann | B02C 19/18 241/23 |
| 6,712,298 | B2 * | 3/2004 | Kohlberg | B02C 19/0087 241/1 |
| 7,246,761 | B2 * | 7/2007 | Hoppe | B02C 19/18 241/1 |
| 7,500,623 | B2 * | 3/2009 | Paris | B02C 19/18 241/1 |
| 7,677,486 | B2 * | 3/2010 | Hoppe | B02C 19/18 241/1 |
| 8,002,209 | B2 * | 8/2011 | Frey | B02C 23/12 241/1 |
| 10,029,262 | B2 | 7/2018 | Ahlqvist Jeanneret et al. | |
| 10,730,054 | B2 | 8/2020 | Kaeppeler et al. | |
| 10,792,670 | B2 * | 10/2020 | Mëller-Siebert | B02C 19/18 |
| 10,919,045 | B2 * | 2/2021 | Weh | B02C 23/36 |
| 2006/0163392 | A1 | 7/2006 | Hoppe et al. | |
| 2015/0069153 | A1 | 3/2015 | Ahlqvist Jeanneret et al. | |
| 2018/0006468 | A1 | 1/2018 | Kappeler et al. | |
| 2021/0269942 | A1 * | 9/2021 | Kanai | B02C 19/18 |

FOREIGN PATENT DOCUMENTS

| | | | |
|---|---|---|---|
| DE | 102014008989 | A1 | 1/2016 |
| JP | 2003154286 | A | 5/2003 |
| JP | 2014528355 | A | 10/2014 |
| JP | 2018507778 | A | 3/2018 |
| WO | 2013053066 | A1 | 4/2013 |
| WO | 2016134488 | A1 | 9/2016 |

* cited by examiner

SYSTEM AND METHOD FOR AN ELECTRODYNAMIC FRAGMENTATION

CROSS-REFERENCE TO RELATED APPLICATION

This application is a continuation, under 35 U.S.C. § 120, of copending international application No. PCT/EP2019/060740, filed Apr. 26, 2019, which designated the United States; this application also claims the priority, under 35 U.S.C. § 119, of German patent application No. DE 10 2018 003 512, filed Apr. 28, 2018; the prior applications are herewith incorporated by reference in their entirety.

BACKGROUND OF THE INVENTION

Field of the Invention

The invention relates to a fragmentation system for the electrodynamic fragmentation of material, containing an inlet and an outlet for transporting material along a transport path, and at least one high-voltage pulse source for generating a high-voltage discharge.

International patent disclosure WO 2013/053066A1, corresponding to U.S. Pat. No. 10,029,262, describes a method for the fragmentation of material by means of high-voltage discharge. The material is introduced together with a process liquid into the process chamber.

BRIEF SUMMARY OF THE INVENTION

It is an object of the invention to provide an improved system for the fragmentation of material.

This object is achieved by means of the fragmentation system having the features of the independent system patent claim. Furthermore, the object is achieved by means of the method for electrodynamic fragmentation having the features of the independent method claim. Preferred and/or advantageous embodiments of the invention and also other invention categories are evident from the further claims, the following description and the accompanying figures.

A fragmentation system for the electrodynamic fragmentation of material is proposed. In particular, the fragmentation system is a continuously operable fragmentation system. The fragmentation system is configured especially for industrial fragmentation of material and/or fragmentation of material designed on a large scale. The fragmentation is preferably a segregated fragmentation. The system is suitable for a segregated fragmentation according to size, type and/or composition. The material is preferably an inorganic material, and especially a composite material. The material can comprise organic components. By way of example, the material is concrete, slag, ceramic or a mining material. The fragmentation of the material preferably serves to obtain secondary raw materials, for example to obtain gravel, sand and/or cement substitute raw materials.

The fragmentation system contains an inlet and an outlet. By way of example, the fragmentation system contains a housing and/or a process vessel, wherein the inlet and/or the outlet are/is arranged in the process vessel and/or in the housing. The material can be provided and/or fed in by means of the inlet. By way of example, the inlet is connected to a material store, for example a feed bunker, wherein the material can be stored in the feed bunker. The outlet serves, in particular, for transporting away and/or carrying away the fed material, the fragments thereof and/or the components thereof and constitutes for example a sink for the material. Between inlet and outlet, material is transported along a transport path in a transport direction. The transport path can be a straight path, a looped path or a jagged path. The transport path is a two-dimensional or three-dimensional path and/or route. The material transport between inlet and outlet suffices especially for conservation of material and/or mass, such that for example the mass of the fed material corresponds to the mass of the material transported away at the outlet. In particular, the fragmentation system can contain a plurality of outlets and/or inlets.

The fragmentation system contains at least one high-voltage pulse source. By way of example, the high-voltage pulse source is a Marx generator. The high-voltage pulse source, in particular each of the high-voltage pulse sources, contains at least one first electrode and at least one second electrode for generating a high-voltage discharge in a discharge chamber. Hereinafter, first and second electrode are always especially mentioned by way of example. However, statements can correspondingly be understood analogously for a plurality of electrodes as well. Preferably, the discharge chamber is arranged between the first electrode and the second electrode. Alternatively, the discharge chamber can be arranged in an environment connecting the first electrode and the second electrode. The first electrode and the second electrode can be embodied such that they are of identical type or different. By way of example, first electrode and/or second electrode are/is a metal electrode, a graphite electrode or some other electrode. Preferably, the first electrode forms a cathode and the second electrode forms an anode. In particular, provision can also be made for first electrode or second electrode to be connected to ground potential, the remaining electrode being connected to a higher or lower potential.

The high-voltage pulse source is configured, in particular, to apply a working voltage between the first electrode and the second electrode in order to generate the high-voltage discharge. The high-voltage discharge can be effected for example from the first electrode through the material into the second electrode. The high-voltage discharge is a high-voltage pulse, in particular. The high-voltage pulse and/or the high-voltage discharge have/has a pulse length. The pulse length is preferably less than one microsecond, in particular less than 100 nanoseconds and especially less than 50 nanoseconds. The high-voltage pulse and/or the high-voltage discharge preferably have/has an energy of less than 500 joules per pulse, in particular less than 300 joules per pulse and especially less than 100 joules per pulse. Preferably, the high-voltage pulse source is configured for generating high-voltage discharges with a frequency of more than 100 Megahertz. The high-voltage discharge and/or the high-voltage pulse have/has a pulse amplitude. The pulse amplitude is preferably identical to the working voltage and/or is between 10 kilovolts and 10 megavolts. Particularly preferably, a pulse amplitude is between 100 kilovolts and 5 megavolts.

The high-voltage source (generator) is embodied in particular in a variable fashion or as a flexible generator. In this regard, the energy consumption for the respective material can be optimized. In this regard, for the fragmentation of concrete, for example, it is possible to determine a minimum energy consumption of 2.3 kWh/t (75 J/pulse), which is in the range of mechanical processing. In comparison with other fragmentation systems, the system according to the invention no longer has to be acoustically isolated and no excess energy is lost as thermal energy resulting in heating of the process medium (water, see below). Economic use of these technologies is possible with such a generator.

In particular, the rise time and/or amplitude and/or power and/or pulse energy content are/is settable at the generator.

The transport path has at least one fractionation section. The fractionation section is for example a partial section of the transport path. The fractionation section can form a main path or a bypass for the main path. The fractionation section preferably has a length of greater than 10 centimeters and especially greater than 50 centimeters. The fractionation section extends at least in sections between the first electrode and the second electrode. More specifically, the fractionation section contains the first electrode and the second electrode and/or the first electrode and the second electrode form the fractionation section. The fractionation section extends through the discharge chamber. In particular, the entire fractionation section extends in the discharge chamber. The fractionation section can also be understood as the section of the transport path in which the high-voltage discharge is effected and/or can be effected.

The fragmentation system contains a selection means for selectively extracting the material in the transport path. The selection means is preferably configured to select material which is situated on the transport path and/or is transported on the transport path, for example to select the material according to size, type and/or shape. The selection means is configured to channel material and/or fragments of the material having a diameter that is smaller than a minimum diameter past at least one portion of at least one of the fractionation sections or past at least one of the fractionation sections. The selection means serves to ensure that, in particular, only material having a diameter larger than the minimum diameter passes into a specific one of the fractionation sections and/or is transported in the fractionation section. The selection means forms for example a filter means, in particular a size filter. By way of example, material and/or fragments of the material smaller than the minimum diameter can be guided past the fractionation section by means of the selection means, for example on the bypass or a detour. The detour can also constitute a fall through a base or sieve. The selection means is situated in particular upstream (relative to the transport direction) of the fractionation section, in the fractionation section or downstream of the fractionation section. Furthermore, the fractionation section can be arranged in the region of the inlet.

In particular, the selection means is configured to separate fragments of the material having a diameter smaller than the minimum diameter which arise during the upstream treatment of the material by means of the high-voltage discharge.

The invention is based on the consideration that as a result of early extraction of material and small fragments, i.e. thus material of a certain size distribution, the latter do not occupy the subsequent downstream fractionation section and so the high-voltage discharge is used there in a targeted manner for larger fragments. This results in an energy-efficient and high-throughput fragmentation system.

Optionally, the selection means can contain the first electrode and second electrode of at least one high-voltage pulse source, alternatively also at least one further electrode. In particular, the first electrode and the second electrode can form the selection means. By way of example, the first and the second electrodes form a sieve structure or a retention means for material and/or fragments of the material having a diameter larger than the minimum diameter. This results in an at least partly integral embodiment of selection means and fractionation section.

Particularly preferably, the first electrode and the second electrode form a rail. The distance between the first electrode and the second electrode is then a rail distance and in particular is less than or equal to the minimum diameter. First electrode and second electrode can be connected mechanically, for example by means of struts, in the rail. Alternatively, first electrode and second electrode are mechanically unconnected in the rail. Electrical insulators, in particular, are a mechanical connection between first electrode and second electrode.

During transport through the fractionation section via the rails, material is comminuted, for example. If the material is small enough to fall between the rails (selection), it is selected within the fractionation section and guided out of the fractionation section. In this regard, it passes through only a portion of the fractionation section and is channeled past the remaining portion thereof (remaining length of the rails).

The invention is based on the fact that it is desirable to be able to recycle composite materials, for example concrete. The aim here is to obtain secondary raw materials. By way of example, it is endeavored to separate concrete and to re-use its constituents. In this case, in particular, the additives such as gravel and sand are selectively freed from the surrounding cement matrix. Manually operated systems and systems on a laboratory scale have been used for this hitherto. The throughput in such systems and/or methods has hitherto been less than three tons per hour. The degree of fragmentation is also often less than 80% in such systems. Higher throughput rates have been attained to date by means of mechanical methods, although such methods lack segregation and have a lower quality of the processed material. By way of example, microcracks arise in gravel grains as a result of a grinding process, and they reduce the mechanical strength in RC concrete.

In particular, the material has a different state at the inlet than at the outlet; by way of example, the material is bonded and/or lumpy at the inlet, while it is fragmented and/or separated at the outlet. The fragmentation is effected by the high-voltage pulse, for example. The fragments of the material have, in particular, a grain size of typically less than one centimeter.

The fragmentation system optionally provides for the fractionation section to be embodied as an inclined plane slipping downward. The fractionation section slopes downward in particular in the transport direction. The fractionation section can slope strictly monotonically. Alternatively, the fractionation section can be embodied as an inclined plane sloping downward with saddle and/or turning points. The fractionation section is embodied in particular such that material transport of the material in the transport direction can be effected without an electrical drive and/or is effected on the basis of gravitation and/or a downhill force. The fractionation section is intended to provide an efficient and energy-saving transport apparatus and in particular to achieve size and/or mass selection along the transport path on the basis of gravitational effects in the inclined plane. A transport device is thus provided which makes it possible to transport large amounts of material. Furthermore, the fragmentation system is particularly energy-saving owing to the gravitational drive of the material transport.

Optionally, provision is made for the first electrode and/or the second electrode to have a longitudinal extent. By way of example, first electrode and/or second electrode are/is embodied in the shape of a bar, for example in the shape of a round bar. The longitudinal extent of the first electrode and/or of the second electrode is preferably at least ten times the magnitude of the diameter of the electrode: the electrodes have an electrode length, wherein the electrode length is preferably greater than 10 centimeters, and in particular is greater than 50 centimeters. The first electrode and/or the second electrode are/is arranged with the longitudinal extent thereof in the same direction as and/or parallel to the transport direction. By way of example, first electrode and second electrode are arranged parallel to one another. It is particularly preferred for first electrode and second electrode to be arranged in a rail-shaped fashion and to form a top-hat rail, for example. By way of example, the material transport is effected in a transport plane, wherein the first electrode and the second electrode are arranged in the transport plane. Alternatively, the first electrode and/or the second electrode can be arranged in the same direction as the transport plane but offset with respect thereto. This configuration is based on the consideration of providing a fragmentation system which is obtainable in a structurally simple way and enables an energy-saving and good fragmentation of the material.

According to the invention, bar-shaped and/or planar electrodes are used, in particular, which form a type of rail system which is used for further transport and classification of the material by way of inclination.

By way of example, the fractionation section forms a chute, wherein the chute is preferably delimited laterally by the electrodes. The high-voltage discharge is preferably effected at an angle of between 60 and 120 degrees with respect to the transport direction. Particularly preferably, the high-voltage discharge is effected perpendicularly to the transport direction.

In one preferred embodiment of the invention, at least two of the electrodes form a chute for the material, said chute sloping downward in the transport path in relation to the direction of gravity.

According to the invention, the material can slide and move on the electrodes. The situation can then occur that a piece of material slides along the entire chute without being comminuted sufficiently, e.g. because only its edges were fragmented. Thus, it can be extracted at the end of the electrode or chute and a stoppage of the process can thus be prevented. The piece of material can then e.g. once again be introduced into the fractionation section or be fed to a further process, possibly a different kind of process (e.g. phasing out as landfill material or comminution by means of jaw crushers for lower quality use). The electrodes which are inclined (with respect to gravity or with respect to the horizontal) act as “passive conveyor belts”. The transport speed of the material can be set by way of the optional angle setting (see below). In particular (see below) the distance between the respective pairs of electrodes in the chute is settable in a variable manner.

According to the invention, the electrodes which are optionally settable in terms of inclination act as chutes (“passive conveyor belts”) for the material. The material transport and the speed thereof are thus effected to a significant extent by the material’s own weight, depending on the size and weight of the material and the angular position of the “rail electrodes”. In addition, the material flow or the speed thereof can be supported by the flow velocity of the surrounding medium (e.g. water, see below) with a velocity component at an inclination with respect to the rail system.

A corresponding chute makes it possible, in particular, to extract material at the end of the respective electrodes or chute—without cross-flow classification—only on account of gravity, optionally also through the assistance of a media flow. The exposed material need not—in the ideal case—be returned into the reaction vessel again after extraction from the reaction vessel. The electrodes are simultaneously, besides the optional medium (e.g. water), the transport medium that determines the path of the material through the reaction vessel.

Motorized conveying means, e.g. conveying belts, are not necessary here in particular in the actual fragmentation process. Such means can be provided e.g. if needed in order to feed material to the process or to carry it away from the process.

In one preferred variant of this embodiment, a length and/or an inclination angle of at least one of the electrodes of the chute and/or a distance between at least two of the electrodes of the chute are/is variable.

According to the invention, in particular the lengths and/or the inclination angles of the electrodes on which the material slides are variable—the unfragmented material moves transversely with respect to the direction of gravity, if appropriate also transversely with respect to the transport medium, through the reaction vessel, while in particular material that is not to be fragmented (any further), e.g. fine material <2 mm, is expelled as a sludge fraction at the bottom directly via the shortest path (direction of gravity). The specific size of 2 mm relates e.g. to the treatment of concrete, since 2 mm corresponds to the grain size of sand. It is optionally possible to support the transport by way of a medium, which enables additional degrees of freedom (media type, media speed, media direction) in the process control.

In this regard, for each material, in particular, it is possible to establish the optimum residence time on an electrode or chute with a variable electrode distance in order to obtain the highest possible degree of exposure. On account of the variable lengths of the electrodes, the material has to cover a longer path in the process vessel than if it simply sank in the direction of gravity. As a result, an electrical pulse treatment occurs more frequently and the degree of exposure can be maximized as a result. Moreover, more material can be processed simultaneously by virtue of the longer process path, which crucially increases the throughput and thus enables an industrial application.

The residence times of the particles (material) in the process vessel are variable according to the invention and there is thus a possibility of optimization for different materials and/or fraction sizes (which require different residence times in the process).

Electrode distances are in particular a maximum and/or a minimum of 2 mm, 4 mm, 8 mm, 16 mm, 32 mm, 64 mm. Intermediate magnitudes of the distances are also selectable and freely settable as necessary.

One preferred embodiment provides for the chute or at least one of the electrodes to be vibratable. Vibrating the chute, etc. results in transport of the material along the chute being homogenized and clogging of material on the chute being made more difficult. Alternatively or additionally, given a suitable electrode shape, electrodes which are mounted rotatably about their own longitudinal axis and which support this process are also conceivable.

According to the invention, the electrodes thus participate not only in the comminution process, but also in the transport process.

Overall, an inclined rail system results, in particular, which makes it possible to transport material along the rail system, (e.g. constituents not yet or not comminutable) and through the rail system (e.g. sufficient comminuted/small constituents). Both can also be supported by a transport medium (water, oil, gas, etc.). The electrodes crucially support the transport process here.

In the case of the inclined rail system, constituents to be fragmented are transported further even if they are larger than the distance between the fragmentation electrodes (smaller particles fall through and larger particles slide along the inclined planes predefined by the rail electrodes) and can be extracted from the fragmentation region and either be introduced again elsewhere, or be transported as “waste product” out of the system and fed to a different use.

Such a rail system cannot become clogged as a result of the inclination. The material is transported further even without mechanical moving parts, i.e. on account of gravity or the downhill force. The material flow rate or the material speed can be set by way of the angular position of the rail system and can additionally be supported by a flowing medium. In addition, further transport can be supported by changing the angular position during operation, or (in particular slightly) vibrating the electrodes.

In the case of the gravity conveying according to the invention, the material is not (only) guided past the electrodes, but rather is guided and transported further through or by means of the electrodes. According to the invention, the material flow is not (only) guided past an electrode arrangement, rather the electrode arrangement itself is part of the material flow or—as it were—integrated into the material flow or directs the material flow. The electrode arrangement (chute/rail system which itself acts/is manifested as an electrode arrangement) is a decisive factor in ensuring that the material flow can flow in the first place.

According to the invention, the transport speed in the case of the electrode arrangement can be crucially concomitantly determined by the inclination of the “chute/rail electrodes”. The transport speed then depends to a significant extent on the material’s own weight (and no longer all that much on the piece size), the angular position of the electrodes and the material proportion having a fraction size smaller than the distance between the rail electrodes. This material proportion can then fall downward through the rail system (electrodes) and be transferred directly into the next process step with the next smaller fraction size. The material flow can additionally be concomitantly supported by a flow of the process liquid or of the possible process gas. This can likewise be supported e.g. by additional vibration or shaking of the rail electrodes.

The electrodes are situated in particular in the process liquid or a correspondingly suitable gas. The electrode feed can be effected from all sides. The material or the material flow is guided in particular completely or at least partly through the electrodes in the process chamber.

The electrode arrangement according to the invention in particular also allows larger fractionation section sizes than the maximum distance between the rail electrodes/electrode pairs. The latter lie on a rail system as electrodes and are also guided by the latter and can simultaneously be processed during material transport. A piece size larger than the respective distance between the rail electrodes is an essential prerequisite here to enable the respective fraction size also to be fragmented further in the associated processing step. In the case of a small piece size, the portions fall through the rail system and are fed to the next processing step.

The distance between the rail electrodes need not be uniform, but rather can e.g. also increase or decrease along the rail system (electrodes). This can be concomitantly taken into account during the adaptation of the next process step/process stage.

By means of the rail electrode system in the ideal case, the entire material can be completely fragmented in one pass. At the same time, insufficiently fragmented portions at the end of the rail electrodes can, by means of suitable conveying measures, be fed once again to the process or the fractionation section or be fed as waste/rejects to a different use (e.g. landfill, road construction, . . . ).

According to the invention, generally all the electrodes can be handled as freely “floating”. An electrode pair can consist of two high-voltage electrodes, for example, which are raised momentarily to the same high voltage, but opposite signs, by means of a suitable high-voltage pulse generator.

A rail electrode system can consist of various electrode configurations, e.g.: the simplest configuration is a rail pair, wherein all that is essential is that a corresponding high-voltage pulse brings the individual electrodes to an electrical potential or potential difference such that a corresponding discharge suitable for the fragmentation can take place between the electrodes. In this case, the electrode potential of the individual electrode can be positive, negative or else at ground potential.

Other configurations of the rail electrode arrangement are a U- or ring-shaped or star-shaped arrangement of rail electrodes/electrode pairs; other arrangements are also conceivable.

One configuration of the invention provides for the fragmentation system to comprise a conveying apparatus for conveying a medium in a media conveying direction. The fragmentation system can also comprise the medium. The medium is preferably a liquid and the medium is especially water. Alternatively, the medium can be gaseous. The conveying apparatus contains for example a pump for conveying the medium. The medium serves to support the material transport. By way of example, the conveying of the medium in the media conveying direction results in portions of the material and/or fragmentation elements of the material being carried along and/or entrained. By way of example, the medium serves for separating the fragments, for example on a chromatographic principle. Particularly preferably, constant and/or continuous media conveying is provided. The media conveying of the medium is preferably effected in the transport direction especially along the transport path. More specifically, the media conveying is effected in the fractionation section. By way of example, the medium is flushed through the fractionation section and/or the transport path by means of the conveying device. The conveying apparatus serves for automatically extracting fragments of the material.

In the case of the invention, the conductivity of the medium, in particular of the process liquid, is of secondary importance. On the basis of a specific pulse shape, both very low conductivity and high conductivity can be employed. In the course of the process, the conductivity of the process liquid generally increases as expected owing to the release of mineral constituents and salts.

A high conductivity is disadvantageous, rather, in other previous methods. A high conductivity increases the current flow through the process liquid, as a result of which more energy in the process liquid is converted as heat and results in the heating of the process liquid. As a result, a large portion of the energy required for the fragmentation of the material is lost in the form of heat. In addition, the process also has to be cooled. This causes the process to become distinctly inefficient, which is also reflected in the significantly higher power required per pulse.

The medium is, in particular, a medium which forms an insulator in the parameter range of the high-voltage discharge, for example for the pulse length and/or pulse amplitude. In particular, the breakdown strength of the medium is greater than the breakdown strength of room air. This configuration is based on the consideration that the high-voltage discharge is not effected via the medium, rather the high-voltage discharge is effected via the material and the material is thus fragmented. More particularly, the medium surrounds the material during material transport.

It is particularly preferred for the media conveying direction or at least one component of this direction to be directed counter to the transport direction. By way of example, the transport direction is directed from top to bottom in relation to the direction of gravity, the media conveying direction then being directed from bottom to top. Alternatively, provision can be made for the media conveying direction or at least one component of this direction to be in the same direction as the transport direction. The media conveying direction can be directed from top to bottom or from bottom to top. In particular, provision is made for the medium to be reusable and/or to be reused. By way of example, after passing through the transport path or after conveying has been effected, the medium is collected and conveyed once again. The collected medium is preferably filtered and/or cleaned in some other way before it is used for conveying again. This configuration is based on the consideration of firstly achieving a good separation of the material fragments and secondly providing a resource-saving fragmentation system.

In particular, the medium is water. In particular, the medium is distilled water. The medium preferably has a breakdown strength of greater than 20 kilovolts per millimeter. More specifically, the medium has a breakdown strength of greater than 40 kilovolts per millimeter and especially a breakdown strength of greater than 60 kilovolts per millimeter. The medium can furthermore be embodied as oil, especially as dried oil. By way of example, the medium is a transformer oil. This configuration is based on the consideration of providing a fragmentation system which has an improved degree of fragmentation and enables an energy-saving fragmentation of the material.

In particular, provision can also be made for the fragmentation system to comprise a returning apparatus. In this case, retained material, for example material retained by the selection means, is transported back in the direction of the inlet. Such returned material must then pass through the process once again, such that it is treated with the high-voltage discharge once again.

It is particularly preferred for the first electrode and the second electrode to be arranged at a distance smaller than the minimum diameter. The first electrode and the second electrode can be arranged parallel, convergently or divergently in the transport direction. By way of example, the first electrode and the second electrode are arranged in a wedge-shaped and/or v-shaped fashion. The convergently arranged first electrode and second electrode form for example the selection apparatus as a lateral boundary; by way of example, an excessively large chunk of material cannot be transported further in the transport direction if the distance between first electrode and second electrode is smaller than its diameter.

One configuration of the invention provides for the distance between the first electrode and the second electrode to be settable. By way of example, the distance between first electrode and second electrode is selectable such that a desired degree of decomposition, a grain size or a degree of fragmentation is achieved. If the first electrode and the second electrode are arranged convergently, then for example the angle between the first electrode and the second electrode can be variable. The angle is preferably set such that the degree of fragmentation that is desired is achieved. Increasing the angle achieves the effect, for example, that fragments having a larger diameter can be transported faster and/or further in the transport direction. By way of example, for a reduction of the angle between first and second electrodes, a better fragmentation is achieved since larger fragment parts can be detained for longer and only small components can advance. This configuration is based on the consideration of providing a fragmentation system which has an improved and/or settable degree of fragmentation.

It is particularly preferred for the fragmentation system to comprise a plurality of high-voltage pulse sources. In particular, the fragmentation system contains at least two high-voltage pulse sources and especially at least three high-voltage pulse sources. The high-voltage pulse sources or the electrodes thereof are arranged along the transport path. In particular, the plurality of high-voltage pulse sources form a multi-stage system. The fragmentation system containing a plurality of high-voltage pulse sources also comprises a plurality of fractionation sections. The different high-voltage pulse sources and/or electrodes of the high-voltage pulse sources are arranged at different fractionation sections. The high-voltage pulse sources and/or fractionation sections are arranged in particular at a distance from one another and/or with no overlap with respect to one another. The high-voltage pulse sources are configured for outputting a high-voltage pulse and/or for generating a high-voltage discharge. In particular, the high-voltage pulse sources of the fragmentation system output different high-voltage pulses and/or high-voltage discharges. In particular, the working voltages of the plurality of high-voltage pulse sources in the fragmentation system are different. The working voltages of the high-voltage pulse sources are adaptable for example to the degree of fragmentation and/or to the grain size in the respective fractionation section. Besides the working voltage, provision can also be made for further pulse parameters to be different for the different high-voltage pulse sources, for example pulse length and/or pulse frequency. More specifically, provision can be made for the working voltage for the high-voltage pulse sources to become smaller along the transport path. This configuration is based on the consideration that a fragmentation system achieves an improved fragmentation as a result of the operation of different high-voltage pulse sources. In particular, the working voltages are adaptable to the respectively prevailing diameter and/or the prevailing grain size.

In particular, the individual fractionation sections 18 are arranged one above another or one beneath another (FIG. 1) in such a way that fragmented material smaller than a maximum size corresponding to the fractionation section can be transferred directly into the next fragmentation stage e.g. by means of gravity and support by a flowing medium. Alternatively, the fractionation sections 18 can also be arranged successively or next to one another or in a form that promotes a high throughput. In this case, the material transfer between the fractionation sections is effected to an increased extent by means of e.g. mechanical, electrical or else hydrodynamic transport methods. Other methods are also conceivable.

In particular, provision is made for the fragmentation system to have material conveying along the transport path of more than 10 tons per hour. Preferably, the material conveying along the transport path is greater than 20 tons per hour and especially greater than 50 tons per hour. The material is for example obtained from and/or out of a feed bunker and conveyed to a respective collecting container at one of the outlets.

It is particularly preferred for the inclined plane to have a slope angle. The slope angle is, in particular, the angle between the fractionation section and/or the transport path and a horizontal. The slope angle is settable, in particular. It is particularly preferred for the slope angle to be settable such that a conveying speed and/or transport speed of the material are/is settable. By way of example, the angle can be set to be steeper if more material is intended to be supplied subsequently and/or the transport speed is intended to be increased. In the case of a build-up of material, provision can be made, for example, the slope angle to be reduced and the inclined plane to be set to be flatter, such that material present first is separated and/or fractionated.

Optionally, provision is made for the fractionation section and/or the transport path to have conveying structures. The conveying structures are embodied as rollers, for example. In particular, the conveying structures and/or the rollers are embodied in a driveless fashion, for example without a motor drive. The electrodes can be part of the conveying structures and/or can form the conveying structures. The conveying structures are configured to support and/or to promote the material transport.

One configuration of the invention provides for the fractionation section and/or the transport path to have sieve structures for extracting extremely small fractions. Extremely small fractions are for example fragments of material and/or material portions which have a diameter and/or a grain size smaller than a minimum diameter, e.g. smaller than two millimeters. Such extremely small fractions fall through the sieve structures, for example, and are thus quickly extracted from the further process, such that only coarse-grained fragments remain and are decomposed further. This configuration is based on the consideration of providing a fragmentation system which enables the fragmentation of material on an industrial scale. In particular, it is provided that a dynamic equilibrium can be established through the use of conveying structures, the conveying device, the inclined plane and/or the sieve structures and the dynamic equilibrium has the effect that material and/or material fragments can be fractionated and/or are separated at a plurality of locations, the throughput thereby increasing. In particular, extremely fine material and/or extremely small fractions which can no longer be fragmented further are/is automatically extracted and can be removed for example with the medium, for example water, such that this does not disturb and/or burden the process further.

Provision can also be made for the fragmentation system to provide a drying apparatus, wherein the fragments are dried in the drying apparatus. Sorting of the fragments is likewise possible, for example direct sorting by means of an apparatus during extraction from the respective section. In this case, it is provided that the fragmented material can be reused and can be fed into a renewed material cycle for the production of fresh concrete, for example.

Further subject matter of the invention is constituted by a method, in particular using the fragmentation system described above, for the electrodynamic fragmentation of material. Material is transported from an inlet toward an outlet along a transport path. The transport path has a fractionation section. At least one high-voltage pulse source has at least one first electrode and at least one second electrode. The high-voltage pulse source generates a high-voltage discharge in a discharge chamber, and the discharge chamber is arranged between the first electrode and the second electrode. A material and/or fragments of the material having a diameter small than a minimum diameter are/is channeled past at least one portion of one of the fractionation sections.

Other features which are considered as characteristic for the invention are set forth in the appended claims.

Although the invention is illustrated and described herein as embodied in a system and a method for an electrodynamic fragmentation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
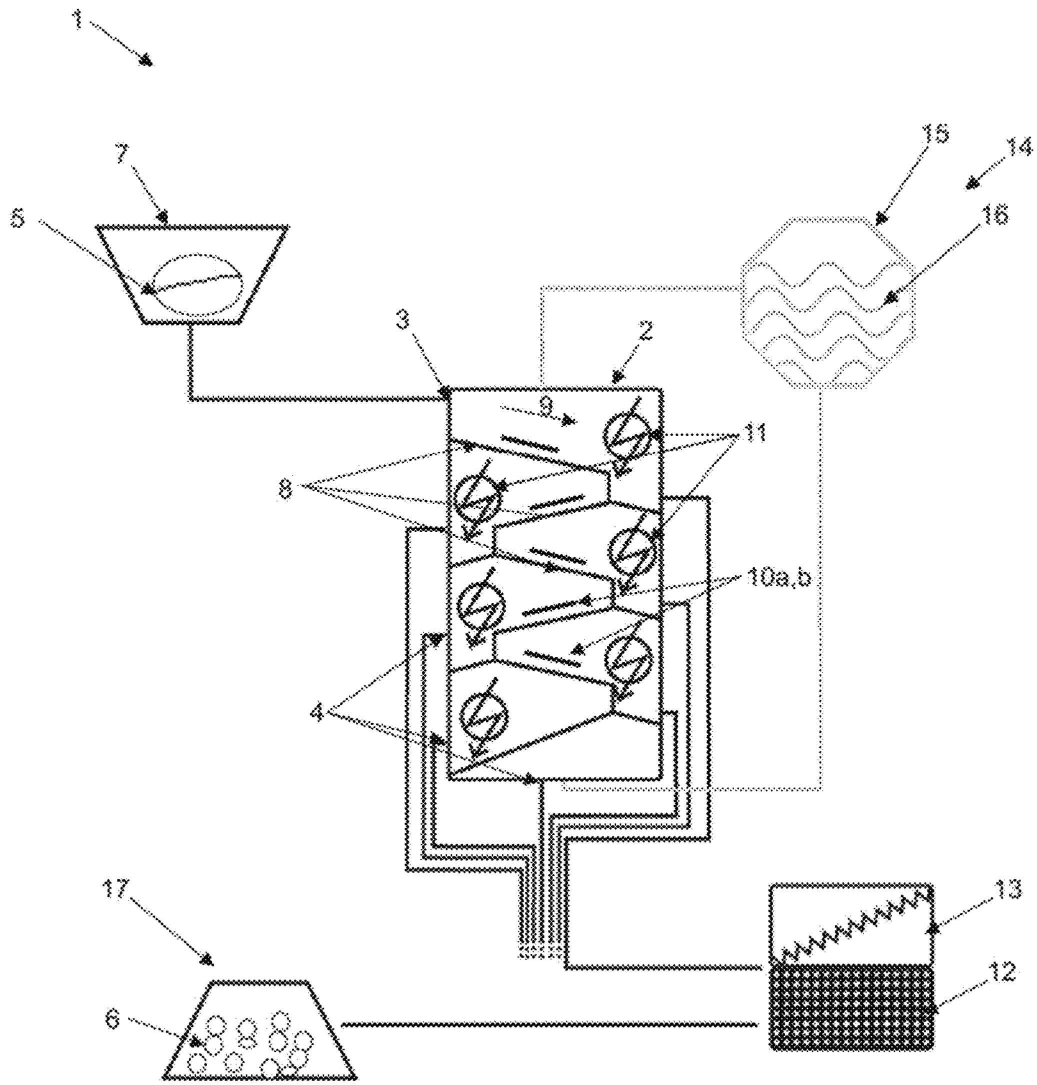
FIG. 1 is an illustration of one exemplary embodiment of a fragmentation system according to the invention.

Referring now to the figures of the drawings in detail and first, particularly to FIG. 1 thereof, there is shown schematically shows a fragmentation system 1. The fragmentation system 1 has a housing 2. The housing 2 is a metal housing. The housing 2 is constructed in the form of a silo. The housing 2 has an inlet 3 and a plurality of outlets 4. Via the inlet 3, which here is configured as a hole in the housing 2, material 5 is introduced into the housing 2. Fragmented material 6 is removed from the housing 2 via the outlets 4. In each case different degrees of fragmentation of the fragmented material 6 are extracted via the plurality of outlets 4. The fragmentation system 1 is connected to a material store 7.

The material store 7 is embodied as a bunker or as a silo. The material 5 can be stored in the material store 7 until fragmentation. The material 5 here is a coarse material, and contains blocks and stone-shaped elements. Here the material is concrete that is intended to be cleaned up and fragmented. The material store 7 is connected to the inlet 3 by means of a line in order to bring the material 5 from the material store into the housing 2.

A transport path 8 is provided in the housing 2. The transport path 8 leads from the inlet 3 to the outlets 4. The transport path 8 is embodied here in a rail-type fashion. The material 5 is transported along the transport path 8 in a transport direction 9. The transport path 8 is embodied as a sequence of inclined planes sloping downward. In particular, the transport path 8 is embodied as a zigzag inclined plane sloping downward. The gradient of the transport path 8 and/or of sections of the transport path 8 is settable in a manner that is not illustrated. The slope angle of the transport path is preferably settable to be between 20 and 80 degrees relative to the horizontal. The conveying speed of the material along the transport path 8 is settable and/or variable by means of the setting of the slope angle of the transport path 8.

The transport path 8 has fractionation sections. In each case a first electrode 10*a* and a second electrode 10*b* are arranged in each of the fractionation sections; in this respect, see also FIGS. 2 and 4. The electrodes 10*a* and 10*b* form a rail. In this case, the distance between the electrodes is less than a respective minimum diameter. The minimum diameters are different for the different fractionation sections, wherein the minimum diameter and/or the distance between the electrodes in the fractionation section decrease(s) over the course of the transport path 8. The material 5 and/or fragments of the material can bear partly on the rails and/or the electrodes 10*a* and 10*b*. The material 5 and/or the fragments of the material can slide and/or be transported on the electrodes.

The fragmentation system contains a plurality of high-voltage pulse sources 11, wherein each of the high-voltage pulse sources 11 contains in each case one of the first electrodes 10*a* and one of the second electrodes 10*b*. The high-voltage pulse sources 11 are configured to generate a high-voltage discharge in a discharge chamber by means of the electrodes 10*a* and 10*b*. Material 5 which is situated on the transport path 8 and is situated between the electrodes 10*a,b* or in the discharge chamber thereof is fragmented by means of the high-voltage pulse and/or the high-voltage discharge. The high-voltage discharge is effected, if material 5 is situated in the fractionation section, by the material 5. A fragmentation of the material 5 corresponds to a comminution and especially a substance-specific comminution and/or cleaning up. The high-voltage pulse source 11 is configured to generate high-voltage discharges with a voltage of greater than 10 kilovolts.

The fragmentation system 1 here contains six high-voltage pulse sources 11 and respectively six electrodes 10*a* and 10*b* arranged at different locations along the transport path 8. The high-voltage pulse sources 11 are operated with different operating parameters, in particular voltage, pulse length and/or power. The power and/or the voltage of the high-voltage pulse sources 11 decrease(s) over the course of the arrangement or in the transport direction 9 from inlet 3 to outlet 4. This is owing to the fact, in particular, that a higher power is required for material 5 in the vicinity of the inlet 3 in order to fragment and/or separate the material, and lower operating parameters and powers are sufficient for material 5 and/or material fragments in the vicinity of the outlet 4 that have already been partly comminuted.

In each case a sieving means 12 and a shaking belt 13 are arranged at the outlets 4 (here indicated symbolically at a distance from the latter). They serve to sort the fragments of the material, for example in such a way that small fragments are directly extracted and larger fragments are brought back into the housing 2 or remain in the housing 2 and undergo the further fragmentation.

The fragmentation system 1 contains a conveying apparatus 14. The conveying apparatus 14 contains a media tank 15. A liquid medium 16, here water, is arranged in the media tank 15. The medium 16 is conveyed in a conveying direction by means of the conveying apparatus 14. In this case, the medium 16 is fed for example in the region of the inlet 3 to the housing and/or to the transport path 8 and is collected at the outlet 4.

The collected medium 16 is filtered by means of a filter device and pumped back into the media tank 15, such that the filtered medium 16 can be conveyed again. The conveying apparatus 14, by means of conveying the medium 16 along the transport path 8, serves to support the transport of the material 5 along the transport path 8. By way of example, the transport speed of the material 5 along the transport path 8 is settable by means of a setting of the conveying rate of the medium 16.

The fragmented material 6 is collected and stored in a collecting container 17. In particular, sieved fragmented material 6 is collected and stored in the collecting container 17. The fragmented material 6 is a comminuted and preferably size- and/or type-purified and/or separated material 5.

Figure 2:
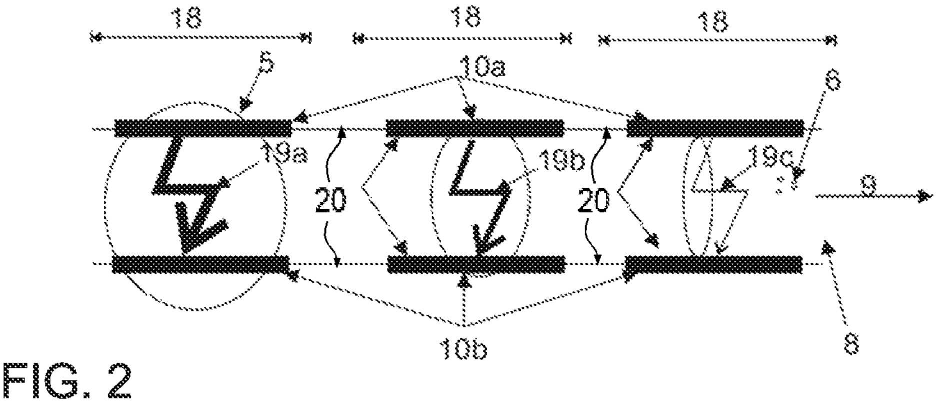
FIG. 2 is an illustration showing a detail view of a transport path as a first exemplary embodiment.

FIG. 2 symbolically shows a segment of a transport path 8, material 5 being transported in the transport direction 9. The transport path 8 has a plurality of fractionation sections 18. The transport path 8 and/or the fractionation sections 18 are/is embodied in a rail-type fashion, for example as top-hat rails. In each case a first electrode 10*a* and a second electrode 10*b* are arranged along the fractionation sections 18. In this exemplary embodiment, the first electrode 10*a* and the second electrode 10*b* are arranged parallel to one another. The electrodes 10*a* and 10*b* delimit the transport path 8 in terms of width. The electrodes 10*a* and 10*b* each have a longitudinal extent, wherein the longitudinal extent is in particular greater than 10 centimeters and is especially greater than 100 centimeters.

The first electrode 10*a* preferably forms a cathode, with the second electrode 10*b* forming an anode. By means of the high-voltage pulse source 11 a high-voltage pulse 19*a*, 19*b* and 19*c* is able to generated as a high-voltage discharge (symbolized as an arrow). The electrodes 10*a* and 10*b* in the different fractionation sections 18 are operated in each case with different operating parameters of the high-voltage pulse source 11. In this regard, the high-voltage pulse 19*a* is a stronger pulse than the high-voltage pulse 19*b*, with the high-voltage pulse 19*b* being a stronger pulse than the high-voltage pulse 19*c*. A stronger pulse means, in particular, that the voltage is greater and/or that the power is greater. While the material 5 before the beginning of the first fractionation section 18 has a first diameter, the partly fragmented material between the first fractionation section and the second fractionation section has a smaller diameter. Fragments which arise as a result of the first high-voltage pulse 19*a*, and have a diameter smaller than the minimum diameter fall through spaces or gaps 20 between the rails and/or electrodes 10*a* and 10*b* (the selection means), such that they do not pass into the region of the second high-voltage pulse 10*b*. The same applies analogously to fragments which arise as a result of the second high-voltage pulse 19*b*. Fragmented material 6 having a diameter smaller than the minimum diameter is present after the last high-voltage pulse.

Figure 3:
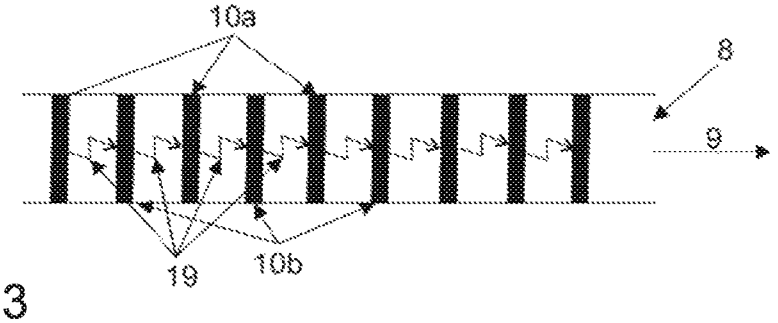
FIG. 3 is an illustration showing a transport path as a second exemplary embodiment.

FIG. 3 shows a further symbolic exemplary embodiment of a transport path 8 for material transport in the transport direction 9. The transport path 8 is once again embodied in a rail-type fashion. The high-voltage pulse sources 11 once again have in each case a first electrode 10*a* and a second electrode 10*b*. In this exemplary embodiment, the electrodes 10*a* and 10*b* are arranged perpendicularly to the transport direction 9. The electrodes 10*a* and 10*b* are embodied as rollers that are rotatable about their longitudinal axis. The roller-type electrodes 10*a* and 10*b* are configured for supporting the material transport. Between the electrodes 10*a* and 10*b*, in each case a high-voltage pulse 19 is able to be generated by means of the high-voltage pulse source 11, wherein the high-voltage pulse 19 is directed in the same direction as the transport direction 9. Between the electrodes 10*a* and 10*b*, material comminution is possible in each case by means of the high-voltage pulse 19.

Figure 4:
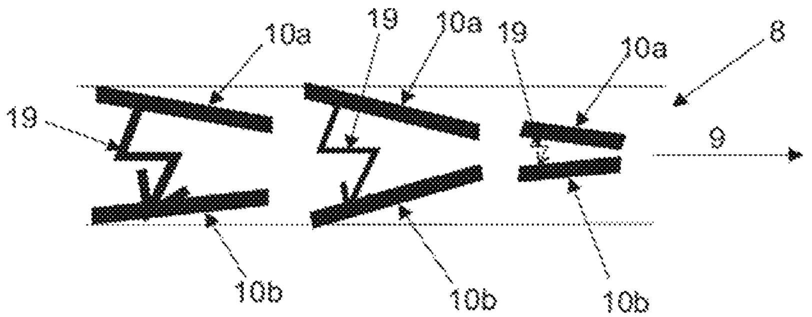
FIG. 4 is an illustration showing a transport path as a further exemplary embodiment.

FIG. 4 shows a further symbolic exemplary embodiment of a transport path 8 for material transport in the transport direction 9. The high-voltage pulse sources 11 once again in each case have a first electrode 10*a* and a second electrode 10*b*. The electrodes 10*a* and 10*b* here are arranged in the same direction as the transport direction 9. However, the electrodes 10*a* and 10*b* of a high-voltage pulse source 11 are not arranged parallel to the transport path 8, but rather form an angle with the transport direction 9. The first electrode 10*a* and the second electrode 10*b* are each arranged in a v-shaped fashion. The distance between the first electrode 10*a* and the second electrode 10*b*, in particular in the constriction region, decreases in the course of the transport path 8 in the transport direction 9. In this regard, the electrodes 10*a* and 10*b* can form a transport retention at their constriction, such that in particular excessively large material fragments are retained. The high-voltage pulse 19 is perpendicular or angled with respect to the transport direction 9 in a manner similar to FIG. 2.

LIST OF REFERENCE SIGNS

1 Fragmentation system
2 Housing
3 Feed
4 Outlet
5 Material
6 Material
7 Material store
8 Transport path
9 Transport direction
10*a,b* Electrodes
11 High-voltage pulse sources
12 Sieving means
13 Shaking belt
14 Conveying apparatus
15 Media tank
16 Medium
17 Collecting container
18 Fractionation section
19*a*-19*c* High-voltage pulse
20 Selection Means

The invention claimed is:

1. A fragmentation system for electrodynamic fragmentation of material, the fragmentation system comprising:
- an inlet and at least one outlet for the material;
- a transport path leading from said inlet to said at least one outlet for transporting the material along said transport path in a transport direction;
- a plurality of fractionation sections in a sequential arrangement along the transport path;
- each fractionation section of said plurality of fractionation sections including a high-voltage pulse source with at least one first electrode and at least one second electrode for generating a high-voltage discharge;
- the high voltage pulse source of each fractionation section operating with operating parameters including at least one of a voltage and a power;
- a magnitude of the operating parameters of the high-voltage pulse source of each fractionation section in the sequential arrangement along the transport path being less than a magnitude of the operating parameters of any preceding fractionation sections in the sequential arrangement along the transport path from the inlet; and
- a selection means for selectively extracting the material on said transport path in order to channel the material and/or fragments of the material having a diameter smaller than a predetermined diameter past at least one portion of one of said plurality of fractionation sections.

2. The fragmentation system according to claim 1, wherein said selection means contains said at least one first electrode and said at least one second electrode.

3. The fragmentation system according to claim 1, wherein said at least one first electrode and said at least one second electrode form a rail.

4. The fragmentation system according to claim 3, wherein said at least one fractionation section sloping downward as an inclined plane has a slope angle for transporting the material based on a downhill force, wherein the slope angle is variable for setting a transport speed for the material along said at least one fractionation section.

5. The fragmentation system according to claim 1, wherein said at least one fractionation section forms an inclined plane sloping downward in the transport direction.

6. The fragmentation system according to claim 1, wherein said at least one first electrode and said at least one second electrode have a longitudinal extent, wherein said at least one first electrode and said at least one second electrode are disposed with the longitudinal extent in the same direction as the transport direction.

7. The fragmentation system according to claim 1, wherein said first and second electrodes form a chute for the material, said chute sloping downward in the transport direction in relation to a direction of gravity.

8. The fragmentation system according to claim 7, wherein at least one the following is variable:
- a length of at least one of said first and second electrodes of said chute; or
- an inclination angle of at least one of said first and second electrodes of said chute: or
- a distance between said first and second electrodes of said chute.

9. The fragmentation system according to claim 1, further comprising a conveying apparatus for conveying a medium in a media conveying direction in order to support a transport of the material.

10. The fragmentation system according to claim 1, wherein a distance between said at least one first electrode and said at least one second electrode is variable.

11. The fragmentation system according to claim 1, wherein said at least one high-voltage pulse source is configured to output a high-voltage pulse having a working voltage of greater than 10 kV as the high-voltage discharge.

12. The fragmentation system according to claim 1, wherein the transport path is configured for conveying more than ten tons of the material per hour.

13. The fragmentation system according to claim 1, wherein said at least one fractionation section has conveying structures.

14. The fragmentation system according to claim 1, wherein the transport path has at least one sieve structure for extracting extremely small fractions of the material.

15. A method for electrodynamic fragmentation of material, which comprises the steps of:
- transporting the material from an inlet toward an outlet along a transport path;
- providing a plurality of fractionation sections in a sequential arrangement along the transport path, each fractionation section of said plurality of fractionation sections including a high-voltage pulse source with at least one first electrode and at least one second electrode, the high-voltage pulse source of each fractionation section operating with operating parameters including at least one of a voltage and a power, and a magnitude of the operating parameters of the high-voltage pulse source of each fractionation section in the sequential arrangement along the transport path being less than a magnitude of the operating parameters of any preceding fractionation sections in the sequential arrangement along the transport path from the inlet;

generating, via the high-voltage pulse source of each fractionation section of the plurality of fractionation sections, a high-voltage discharge between the at least one first electrode and the at least one second electrode; and channeling the material and/or fragments of the material having a diameter smaller than a minimum diameter past at least one portion of one of the plurality of fractionation sections.

* * * * *